March 1, 1938. E. A. SANFORD 2,109,930
HEATING APPARATUS
Filed May 25, 1937 2 Sheets-Sheet 1
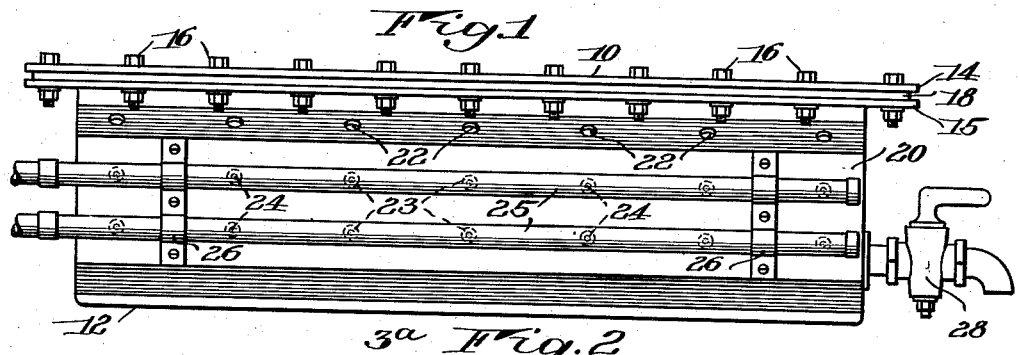
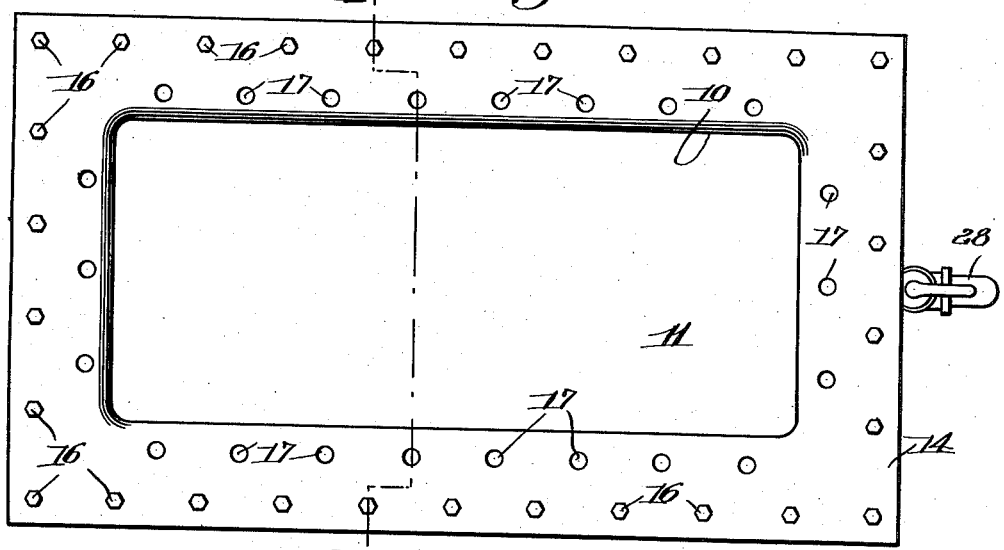
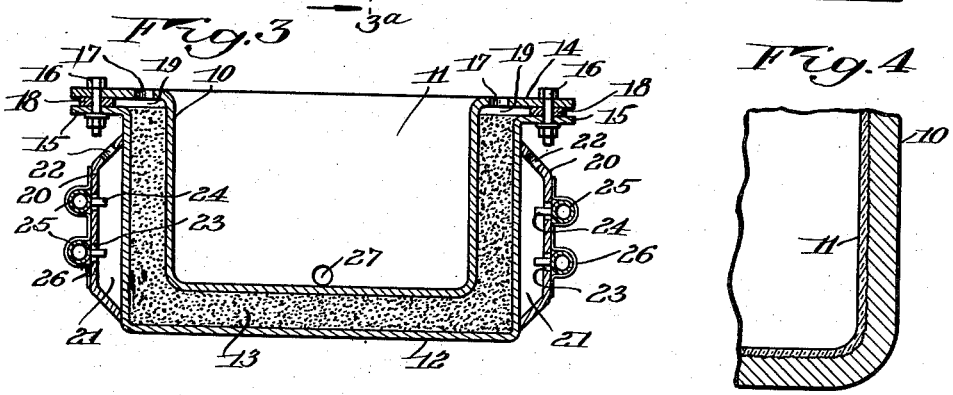
INVENTOR.
Elbert A. Sanford
BY Cumpston & Shepard
his ATTORNEYS March 1, 1938.  E. A. SANFORD  2,109,930
HEATING APPARATUS
Filed May 25, 1937  2 Sheets-Sheet 2
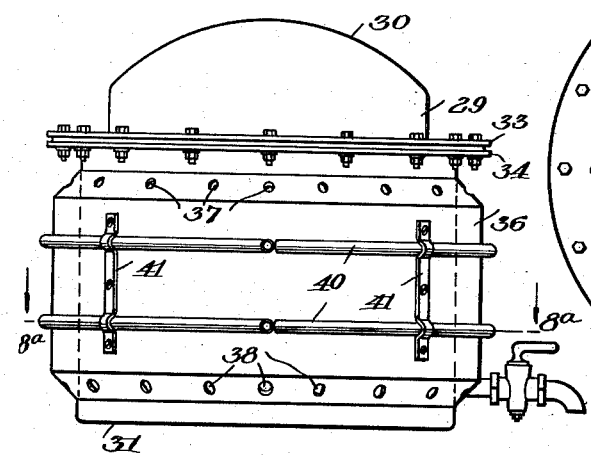
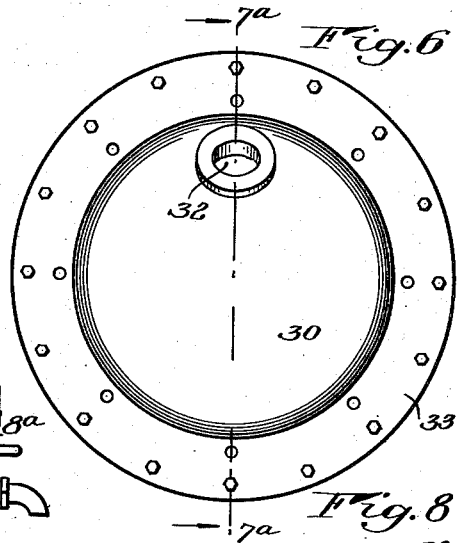
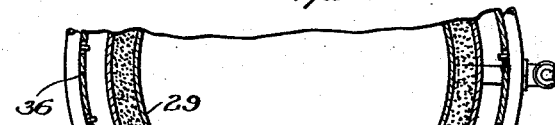
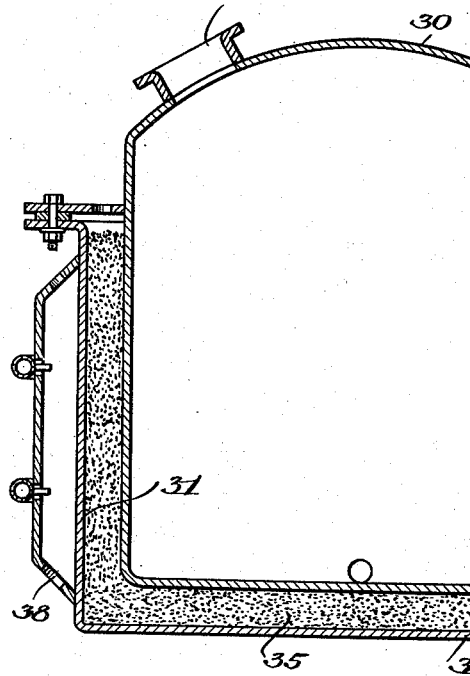
INVENTOR.
Elbert A. Sanford
BY Cumpston & Shepard
his ATTORNEYS Patented Mar. 1, 1938

2,109,930

UNITED STATES PATENT OFFICE 2,109,930

HEATING APPARATUS

Elbert A. Sanford, Irondequoit, N. Y., assignor to The Pfaudler Co., Rochester, N. Y., a corporation of New York Application May 25, 1937, Serial No. 144,688

6 Claims. (Cl. 263—11)

This invention relates to heating apparatus, and, more particularly, to apparatus for heating various substances such as chemicals, metal alloys, and the like, in connection with manufacturing processes, one object of the invention being to provide an improved apparatus for such purposes of a more durable character and with a minimum tendency to contamination of the substances to be heated by the material of which the apparatus is constructed.

To these and other ends the invention resides in certain improvements and combinations of parts, all as will be hereinafter more fully described, the novel features being pointed out in the claims at the end of the specification.

In the drawings:

Fig. 1 is a side elevation of an apparatus embodying the present invention;

Fig. 2 is a top plan view of the same;

Fig. 3 is a section on line $3a$—$3a$ in Fig. 2;

Fig. 4 is an enlargement of a portion of Fig. 3;

Fig. 5 is a side elevation of a modified apparatus embodying the invention;

Fig. 6 is a top plan view of the same;

Fig. 7 is a section on the line $7a$—$7a$ in Fig. 6;

Fig. 8 is a section on the line $8a$—$8a$ in Fig. 5, and

Fig. 9 is an enlargement of a portion of Fig. 7.

The same reference numerals throughout the several views indicate the same parts.

For many manufacturing purposes and processes it is desirable to employ apparatus for heating various substances which in many instances are of such character, or require such conditions as to temperature and the like as to involve technical difficulties. Chemical substances, such, for example, as acids, particularly at relatively high temperatures, tend to attack the metal material of the containers for the same, thus not only tending to contaminate the substances to be heated, but also to destroy the containers. As another example, some metal and metal alloys, particularly when heated to relatively high temperatures, tend to combine with the metallic material of the containers for the same, thus forming undesirable chemical compounds which contaminate such metals or metal alloys, and also destroy the containers for the same.

It has been a common practice to construct such heating containers of steel which is subject to the above difficulties, and it has been proposed to overcome such difficulties by constructing such containers of alloy metals more resistant to attack, but such alloy metals are not sufficiently free from such tendencies and are furthermore excessively expensive.

It has been the practice also to heat such kettles, tanks, vats, or other containers for the substances to be treated by applying to their outer walls, more or less directly, various sources of heat, involving a tendency to heat some portions more intensively than others, to produce the desired temperature in the treated substances. Such methods of heating tend to oxidize and destroy the container walls and, moreover, result in excessive localized heating, or hot spots, thus producing excessive heating and oxidation at such spots and injury to the container, as well as unequal expansion and contraction which warps and deforms the container. It has also been the practice to heat the treating container by immersion in a liquid medium such as water, oil, or molten metal contained in an outer vessel heated externally by applied sources of heat, but such methods are subject to the objections of not being adapted for relatively high temperatures, or of being expensive to maintain. Some types of apparatus have employed a circulating gaseous or liquid heating medium such as steam, preheated oil, or the like, but these have been open to the same objections, as well as being cumbersome and expensive to install and operate.

The problem presented by these difficulties has been solved by the present invention of which a preferred embodiment is herein disclosed by way of illustration. One form of container for the materials to be heated is shown at 10, Figs. 1 to 4, inclusive, as a tank constructed of steel or any other known or suitable metal. In this particular form the tank is rectangular in shape with an open top, but of course other shapes and forms may be employed. Such a metal tank has the inner surface of its walls coated with a vitreous or glass enamel 11 of a composition adapted to withstand the character of substances to be heated and the range of temperatures to be employed. Such glass-lined tanks have been employed for other purposes and their construction is well known. The term "glass" is used, of course, in a broad sense as inclusive of any coating of the ceramic character suitable for the purpose. It is well known that such glass linings may be made with such a constituency as to be impervious to chemicals, including strong acids, as well as to temperatures of a relatively high range.

So far as I am aware, however, such glass-lined containers have not been employed for the purposes of the present invention, because it has been assumed that the heating of contained substances to relatively high temperatures by the external application of sources of heat would produce such unequal and high heating of portions of the glass lining as to cause such enamel to crack and chip off at the hot spots so produced. Also that the unequal heating would produce unequal expansion and contraction of the container and result in similar cracking of the enamel, requiring frequent and expensive repairs.

It has been found, however, that this difficulty also may be overcome by suitable provisions. To this end the container 10 is placed in a relatively spaced, outer container or jacket 12, and a solid refractory material 13 is interposed in the space between the inner and outer containers, preferably filling the same as represented in Fig. 3, the sources of heat then being applied externally to the jacket 12. The refractory material may be sand, mineral wool, asbestos, alundum, carborundum, or any other refractory or heat resisting material of a noninflammable and noncombustible nature capable of transmitting and distributing and diffusing the heat uniformly to the inner container.

In the present exemplary embodiment, the top edge of the container 10 is turned outwardly to provide the horizontally extending flange 14, Fig. 3, which is secured to a similar flange 15 on the jacket 12, as by means of the bolts 16. Preferably flange 14 is formed with a multiplicity of vent openings 17 for the escape of gases or for filling the interposed space with the refractory material, a spacing plate 18 being preferably interposed between flanges 14 and 15 so that with the outer container 12 filled to the top with the refractory material, a space 19 may be preserved below the openings 17. By this construction the inner and outer containers are secured attached to one another but may be readily detached, if desired, for inserting or replacing the refractory material 13, or for repairs to the containers.

In the present embodiment, it is preferred to associate the heating units with the outer container or jacket 12 by welding or otherwise securing externally to its side walls one or more metal housings 20 which may extend partially or entirely around jacket 12. This housing is spaced at its central portion from the jacket 12 to form a heating chamber 21 and may be provided with vent openings 22. The housing or housings 20 may be left open also at their ends at the corners of the jacket to increase the circulation of air.

The heating units may be of any known and suitable variety, such as the gas burners shown in the present instance. These are associated with the housings 20 by forming the latter with openings 23 through which project burner jets 24 in gas manifold pipes 25 extending longitudinally of the housing and secured thereto by means of straps 26. At 27 is a discharge outlet for the inner container 10, controlled by a nozzle valve 28.

Figs. 5 to 9, inclusive, illustrate a modified form of apparatus in which the inner container 29 is closed by a top 30 and is round in shape, with a correspondingly shaped, spaced jacket 31. At 32 is a manhole fitting for access to the inner container which is also provided with a flange 33 bolted to a flange 34 on the jacket, this flange connection being similar to that described in connection with the modification of Figs. 1 to 4, inclusive. In this modification the inner container and outer jacket are separated by a filling of sand or other solid refractory material 35. The jacket is equipped with a housing 36 generally similar to the housing 20 of the modification described above, with vent openings 37 and 38. In a similar way, gas burner jets 39 extend inwardly through openings in the housing from manifold pipes 40 fixed on the housing as by means of straps 41.

While it is preferred to employ a refractory material in a relatively fine state of subdivision, like sand or the other substances referred to above, it is to be understood that one or more sheets or bodies of refractory material, such as a sheet or board of asbestos, may be interposed in the space between the inner container and the jacket and secured, if desired, to the walls of either the container or jacket, in place of a filling of refractory material in finely divided form.

It will also be understood that in place of the gas burner heating units illustrated in the drawings, any other known or suitable form of heating unit may be used to apply heat to the outer surface of the walls of the jacket. In any case, the heat is transmitted from the jacket to the interposed filling of refractory material through which it is distributed and diffused so that it reaches the inner container in a state of substantially uniform distribution. In this way the creation of hot spots is avoided, so as to avoid excessive heating and injury to the enamel lining of the inner container, as well as the unequal expansion and contraction which tends to break and chip off such enamel. The burning away of the outer surface of container 10 is also largely avoided.

The invention thus accomplishes the objects stated and it has been found that substances of a corrosive nature may be heated to relatively high temperatures without attacking the container for the same, and such heating may be employed without serious detriment to the container itself. In liquefying some of the combinations of high-grade non-ferrous metals for the making of alloy metal precision bearings, or in liquefying zinc base die castings, for example, where it is desirable to keep the iron content below one-tenth of one per cent, the present apparatus may be satisfactorily employed without contamination of the metal alloys and without excessive deterioration of the container for the same or other portions of the heating apparatus.

While I have illustrated and described herein a suitable construction, those skilled in the art will readily devise various other modifications of the same within the principles of the invention as set forth in the appended claims.

I claim:

1. In an apparatus for heating substances, a glass-lined metal container for the substances to be heated, a spaced jacket for said container, a refractory material interposed in the space between said container and jacket to distribute and spread the heat transmitted to the walls of said container to avoid excessive localized heating thereof, and means for applying heat to the outer side of said refractory material.

2. In an apparatus for heating substances, a glass-lined metal container for the substances to be heated, a spaced jacket for said container, a solid refractory material in a relatively fine state of subdivision interposed in the space between said container and jacket to distribute and spread the heat transmitted to the walls of said container to avoid excessive localized heating thereof, and means for applying heat to said jacket.

3. In an apparatus for heating substances, a glass-lined metal container for the substances to be heated, a spaced jacket for said container, means for detachably connecting said container and jacket together, a solid refractory material interposed in the space between said container and jacket to distribute and spread the heat transmitted to the walls of said container to avoid excessive localized heating thereof, and means for applying heat to the outer side of said refractory material.

4. In an apparatus for heating substances, a glass-lined metal container for the substances to be heated, a spaced jacket for said container, a refractory material interposed in the space between said container and jacket to distribute and spread the heat transmitted to the walls of said container to avoid excessive localized heating thereof, a housing on the outer side of said jacket, and means for applying heat within said housing to said jacket.

5. In an apparatus for heating substances, a glass-lined metal container for the substances to be heated, a spaced jacket for said container, means for detachably connecting said container and jacket together, a solid refractory material interposed in the space between said container and jacket to distribute and spread the heat transmitted to the walls of said container to avoid excessive localized heating thereof, a vented housing on the outer side of said jacket, and means for applying heat within said housing to said jacket.

6. In an apparatus for heating substances, a glass-lined metal container for substances to be heated, a spaced jacket for said container, means for detachably connecting said container and jacket together, a solid refractory material in a relatively fine state of subdivision interposed in the space between said container and jacket to distribute and spread the heat transmitted to the walls of said container to avoid excessive localized heating thereof, a vented housing on the outer side of said jacket, and means for applying heat within said housing to said jacket.

ELBERT A. SANFORD.